United States Patent [19]
Belart et al.

[11] Patent Number: 4,489,989
[45] Date of Patent: Dec. 25, 1984

[54] AUXILIARY POWER ASSISTED MASTER CYLINDER ARRANGEMENT FOR A VEHICLE BRAKE SYSTEM

[75] Inventors: Juan Belart, Walldorf; Jochen Burgdorf, Offenbach-Rumpenheim; Dieter Kircher, Frankfurt am Main; Helmut Steffes, Eschborn; Hans-Wilheim Bleckmann, Obermoerlen, all of Fed. Rep. of Germany; André F. L. Goosens, Rumst; Willi van Kelst, Putte, both of Belgium; Lutz Weise, Mainz, Fed. Rep. of Germany

[73] Assignee: ITT Industries, Inc., New York, N.Y.

[21] Appl. No.: 394,371

[22] Filed: Jul. 1, 1982

[30] Foreign Application Priority Data

Aug. 6, 1981 [DE] Fed. Rep. of Germany ....... 3131095

[51] Int. Cl.$^3$ .............................................. B60T 13/14
[52] U.S. Cl. .................................... 303/92; 303/114; 303/116
[58] Field of Search .......................... 303/114, 116, 96; 188/181 A, 181 R

[56] References Cited

U.S. PATENT DOCUMENTS 3,922,023 11/1975 Harries ................................. 303/114
3,927,915 12/1975 Adachi ................................. 303/92
4,346,942 8/1982 Lieber ................................. 303/114

FOREIGN PATENT DOCUMENTS 2103319 2/1983 United Kingdom ................ 303/114

Primary Examiner—Bruce H. Stoner, Jr.
Assistant Examiner—Alvin Oberley
Attorney, Agent, or Firm—James B. Raden; William J. Michals

[57] ABSTRACT

In an auxiliary power assisted master cylinder arrangement for a vehicle brake system to generate a controlled brake pressure in associated wheel brake cylinders, there is provided a brake valve with a preceding servo travel simulator to effect a control of the wheel brake cylinders of a vehicle. In one construction of the arrangement, there is interposed between two master cylinder units a pedal-operable device including mechanical cross links connecting with the master cylinder units as well as another cross link connecting with the brake valve. The brake valve is movable into engagement with the servo travel simulator, while the pedal-operable device, under normal braking conditions, is acted upon by the controlled pressure from an auxiliary power source in opposition to the pedal pressure and includes a lock providing for interlocking of all mechanical links in the event of a failure of auxiliary power. In another construction, each master cylinder unit is preceded by a second lock which is normally released with auxiliary power available and, in the event of a failure of the auxiliary power, couples the master cylinder units with the associated cross links at least in the direction of pedal operation. The present invention is advantageously employed as a brake slip control apparatus.

34 Claims, 4 Drawing Figures

AUXILIARY POWER ASSISTED MASTER CYLINDER ARRANGEMENT FOR A VEHICLE BRAKE SYSTEM

BACKGROUND OF THE INVENTION

The present invention relates to an auxiliary power assisted master cylinder arrangement for a vehicle brake system. Various constructions of master cylinder arrangements operative to generate a controlled brake pressure in associated wheel brake cylinders are already known, even such equipped with a valve arrangement connected to a source of auxiliary power and adapted to operate the master cylinder piston, wherein the valve arrangement is in turn operable through the brake pedal under the control of a device including mechanical links which effect a control of the master cylinder(s) in the event of a failure of the auxiliary power.

A power-assisted master cylinder arrangement of this type is known in the form of a brake slip control apparatus as disclosed in German published and examined patent application DE-AS No. 2,366,108. It includes a master cylinder arrangement embodying three master cylinder units disposed in parallel. A booster arrangement is inserted in front of such master cylinder units. For each master cylinder unit, the booster arrangement possesses a booster piston to mechanically operate the associated master cylinder piston in any braking situation. The ends of the booster pistons which are not engaged with the master cylinder pistons extend in a sealed booster chamber into which pressure fluid may be admitted through a booster valve. The booster valve is operable by the brake pedal through a valve member including an actuating rod. In normal operation of a brake, actuation of the brake pedal will open the booster valve and pressure fluid will be admitted to the booster chamber. The supplied controlled pressure will act upon the secondary ends of the three booster pistons which will displace the associated subsequent master cylinder pistons of the master cylinder units and thereby effect a static activation of the wheel brake cylinders. In the event of a failure of the auxiliary power, a cross link of the actuating rod will directly engage the secondary ends of the booster pistons to thereby effect displacement of these pistons and consequently an (auxiliary) static activation of the wheel brakes. In the anti-skid control operation of a wheel brake cylinder and during normal operation of the brake, i.e., with auxiliary power being available, the end of the respective booster piston on the side close to the master cylinder piston will be acted upon by pressurized fluid against the pressure acting on the secondary end of the piston in the booster chamber, such that the booster piston will be returned in spite of a pressure existing in the booster chamber, whereby the associated master cylinder piston will be released to assume its brake release position and the brake pressure supplied to the controlled wheel brake cylinder will be decreased. In view of the tandem design of the booster and master cylinder arrangement, the known brake slip control apparatus includes relatively many single parts and sealing points. The structure is relatively incompact and complicated. The susceptibility to failure in operation is accordingly high. In particular, the known arrangement requires that a large volume of auxiliary power be made available to compensate for the increased volume of the booster chamber resulting from a failure of a brake circuit and to ensure application by pressure of the remaining intact booster pistons in a satisfactory manner. Also, to build up a counterpressure at the booster in the anti-skid control operation, a comparatively large amount of auxiliary power is necessary, so that the auxiliary power supply system has to be amply dimensioned in its entirety. In particular, a relatively large fluid accumulator and/or a control pump with a relatively high delivery have to be provided. Because in practical operation of a vehicle the anti-skid control operation occurs only rarely, the above-mentioned disadvantages have a pronounced impact.

SUMMARY OF THE INVENTION

It is an important object of the present invention to provide a power-assisted master cylinder arrangement for a vehicle brake system of the type initially referred to which is efficient and safe in operation while affording a simple structure.

According to the present invention, this object is achieved by the provision of a brake valve preceded by a servo travel simulator for an activation of wheel brake cylinders of a vehicle.

In an advantageous development of this invention, there is interposed between the master cylinder units of the master cylinder arrangement a pedal-operable device in piston design, including mechanical cross links connecting with the master cylinder units as well as another cross link connecting with the brake valve which is movable into engagement with the servo travel simulator, wherein the device, under normal braking conditions, is acted upon by the controlled pressure from the auxiliary power source in opposition to the pedal pressure and includes a lock providing for interlocking or all mechanical links in the event of a failure of the auxiliary power.

In an advantageous construction, each master cylinder unit is preceded by a second lock which is normally released with auxiliary power available, and, in the event of a failure of the auxiliary power, couples the master cylinder unit with the associated cross link at least in the direction of pedal operation.

A third lock subsequent to the brake valve and normally closed with auxiliary power available may be provided upon which the brake valve takes support and which releases the brake valve and the servo travel simulator in the direction of pedal operation on failure of the auxiliary power.

In a particularly advantageous construction, additional solenoid valves may be connected to the master cylinder arrangement enabling the arrangement to be used as a brake slip control apparatus.

Another suitable improvement is manifested by the feature that it comprises two substantially identical master cylinder units arranged in parallel for a static activation of two wheel brake cylinders in two brake circuits through two respective brake line systems with respective compensating lines, a brake valve arranged parallel with the two master cylinder units and preceded by a servo travel simulator for a dynamic activation, under normal braking conditions, of the remaining wheel brake cylinders of a vehicle in a third brake circuit through an associated third brake line system including a return line to a hydraulic reservoir, and a separate connecting line for each master cylinder unit between the auxiliary power outlet port of the brake valve and the secondary end of the piston of the master cylinder unit including a return line to the fluid reservoir.

Advantageously, the two wheel brake cylinders of the front axle of a vehicle are statically activated by the master cylinder units in two brake circuits, whereas the wheel brake cylinders of the rear axle are dynamically activated by the brake valve in the third brake circuit.

The master cylinder units, the brake valve, the servo travel simulator and, as the case may be, the pedal-operable device as well as the locks are suitably received in a single housing in which also the unpressurized hydraulic reservoir may be integrally formed, wherein the mechanical cross links may be situated in the hydraulic reservoir area of the housing.

In accordance with a further aspect of this invention, the pedal-operable device comprises a first piston mechanically coupled with the brake pedal and a second hollow piston embracing the first piston and guided in a receiving bore in a sealed relationship thereto, wherein the two pistons define the boundaries of an inner chamber with sealing members and an auxiliary power line adapted to be shut off to form a hydraulic lock, wherein the first piston is connected at its end close to the pedal to the mechanical cross link extending to the brake valve, and the second piston is connected at its end close to the pedal to the mechanical cross links extending to the master cylinder units.

A particularly simple structure results if the second piston and the associated mechanical cross links are integrally formed.

In particular, the compensating bores of the second piston which are associated with the inner chamber may directly lead to the hydraulic reservoir integrated into the housing, with the mechanical cross link that cooperates with the brake valve extending through the one longitudinal compensating bore in a substantially non-contact fashion.

At its end close to the pedal, the second piston may be moved into engagement with an abutment collar or abutment washer of the housing.

A compression spring extending in the piston direction is suitably seated in the inner chamber between the first and the second pistion.

The sealing member of the inner chamber between the first and the second piston which is close to the pedal may be designed as a cup seal, whereas the remaining sealing members of the inner chamber are ring seals.

The auxiliary power line of the inner chamber is suitably in communication with the return line or the auxiliary power outlet port of the brake valve and includes a normally open, two-way, two-position directional control valve which shuts off the line connection upon the occurrence of a signal indicative of an auxiliary power failure, whereby the fluid is prevented from leaving the chamber. If the two-way, two-position directional control valve of the auxiliary power source is connected, an additional reaction force will ensue at the brake pedal. The two-way, two-position directional control valve may be controlled electromagnetically or directly by the pressure from the auxiliary power source.

The receiving bore and the second piston of the device define the boundaries of a chamber remote from the pedal and communicating with the third brake line system of the dynamically activated wheel brake cylinders.

Advantageously, the brake valve comprises an inner hollow control piston which is controllable by a preceding actuating rod of the servo travel simulator.

In particular, the servo travel simulator secured to the actuating rod is biased against the direction of the brake actuating force by a compression spring supported in a stop bushing.

The master cylinder unit may suitably comprise a master cylinder piston which is spring-biased in opposition to the direction of a brake actuating force, includes a cup seal and, at its end close to the pedal, a blind-end bore defining the boundary for the secondary end of the master cylinder pistion and accommodating a valve tappet connected to the mechanical cross link of the second piston and having an inner bore.

Advantageously, a normally open two-way, two-position directional control valve is provided in the connecting line between the master cylinder units and the auxiliary power outlet port of the brake valve, with another two-way, two position directional control valve which is open during the control operation, being provided in the return line between the secondary end of the master cylinder piston and the hydraulic reservoir, the valves being electromagnetically or hydraulically actuatable.

In order to also permit static activation in the third brake circuit of the rear axle in the event of failure of the auxiliary power system, a normally open two-way, two-position directional control valve is arranged in the supply line between the auxiliary power outlet port of the brake valve and the associated wheel brake cylinders of the third brake line system ahead of the branching point to the chamber, remote from the pedal, of the pedal-operable device, this valve inhibiting fluid flow under electromagnetic or hydraulic control in the event of a failure of the auxiliary power.

A particularly suitable, compact construction wherein each master cylinder unit is preceded by a second lock normally released with auxiliary power available comprises two substantially identical master cylinder units arranged in parallel for a static activation of two wheel brake cylinders in two brake circuits through two respective brake line systems with respective compensating lines, a brake valve arranged in parallel between the two master cylinder units and preceded by a pedal-operable servo travel simulator for a dynamic activation, under normal braking conditions, of the remaining wheel brake cylinders of a vehicle in a third brake circuit through an associated third brake line system including a return line to a hydraulic reservoir, with the servo travel simulator including mechanical cross links close to the pedal, associated with the master cylinder units and adapted to actuate the master cylinder units if the auxiliary power fails, and a separate connecting line for each master cylinder unit between the auxiliary power outlet port of the brake valve and the secondary end of the piston of the master cylinder unit, including a return line to the unpressurized fluid reservoir.

In particular, the third lock comprises a piston received in a blind-end bore in the housing, with an internal compression spring being seated between the piston and the bottom of the blind-end bore, and the inner chamber of the lock that is formed by the piston and the blind-end bore is connected to the source of auxiliary power.

The entire brake valve may be slidably received in the housing and takes support upon the secondary end of the piston of the third lock.

The brake valve suitably comprises an inner control piston which is controllable by a preceding actuating rod of the servo travel simulator.

The servo travel simulator suitably includes a travel-limiting spring chamber with at least one internal spring bearing against an axially slidable spring ring of the chamber, the ring being axially fixed to the chamber wall on the side remote from the pedal.

In particular, the travel-limiting spring chamber accommodates several springs with different spring characteristics which in a normal braking operation are movable into engagement with the end face of the spring ring that is close to the pedal.

The springs are advantageously concentrically nested compression springs and in particular partly separated from one another by inner bushings or inner bushing segments.

The actuating rod of the servo travel simulator possesses an enlarged middle section whose end close to the pedal is movable into engagement with the end of the spring ring that is remote from the pedal, as well as a reduced-diameter rod section which is close to the pedal, extends into the travel-limiting spring chamber and is axially slidably held by the spring ring.

The travel-limiting spring chamber of the servo travel simulator may be connected to the unpressurized fluid reservoir.

In order to also enclose the area of the actuating rod remote from the pedal with hydraulic fluid, the spring ring has advantageously at least one passage bore for the unpressurized hydraulic fluid.

A particularly compact structure will result if the cross links and the housing of the travel-limiting spring chamber of the servo travel simulator are formed integrally with one another.

In another advantageous construction of this invention, the master cylinder unit comprises a master cylinder piston provided with a cup seal and spring-biased against the brake actuating force, the end of the piston that is close to the pedal being preceded by a piston tappet axially held against the brake actuating force on the side close to the pedal, the tappet having on the side remote from the pedal a reduced section whose outside diameter is smaller than that of the secondary end of the master cylinder piston close to it, with a circumferential chamber being formed in the area of the reduced-diameter section for termination of the connecting line from the master cylinder unit thereinto.

The second lock for the master cylinder unit suitably comprises a piston tappet member provided with a cup seal and spring-biased against the brake actuating force, with its reduced-diameter end remote from the pedal being snugly and slidably received in a blind-end bore of the piston tappet on the side close to the pedal, and its reduced-diameter end close to the pedal being in, or being movable into, an engagement with the respective cross link of the servo travel simulator, wherein the end of the piston tappet member that is remote from the pedal causes an inner circumferential chamber to be formed into which a hydraulic line terminates containing a two-way, two-position directional control valve which is closed when the auxiliary power is available and otherwise open, and is connected with the return line.

On the side of its middle section close to the pedal, the piston tappet member of the second lock may be axially located in a direction opposite the brake actuating force.

The locks are advantageously designed as hydraulic locks, however, they may also be designed as mechanical locks controlled by the accumulator pressure which will engage only if the brake pedal is actuated from its inactive position.

To provide an improved support of the moments in a braking action, a particularly advantageous concept of this invention provides a guide bore in the housing which extends parallel to the axis and centrally between two master cylinder pistons and is engaged by the pedal-operable device or a guide rod in the direction of the actuating force.

The master cylinder pistons and the brake valve with the preceding servo travel simulator may be equidistantly spaced in the housing over the circumference.

For static operation of the wheel brake cylinders of the front axle, a volume compensating cylinder may be arranged in a hydraulic line extending between the working chambers of the master cylinder units. If the master cylinder arrangement is designed as a brake slip control apparatus, the hydraulic line accommodates a normally open, for instance electromagnetically actuatable, two-way, two-position directional control valve which in the event of a brake slip control of a front wheel will block the hydraulic line to then disable the compensating cylinder.

The present invention provides a power-assisted master cylinder arrangement of a vehicle brake system, for example, a brake slip control apparatus, of small and light-weight construction, particularly a master cylinder arrangement of twin design. It is a substantial advantage of this invention that in normal operation the brake pedal is able to perform an actuating travel going beyond the length of displacement of the brake valve, whereby an operating characteristic customary in brake apparatuses is achieved. The brake valve of this invention with its preceding servo travel simulator permits dynamic activation of wheel brakes. With a suitable circuitry provided, the pressure which is modulated in the brake valve is also able to control a further master cylinder. Preferably, two paralleled master cylinders are provided which are actuatable not only by the controlled pressure of the brake valve but also mechanically under emergency conditions, that is in one embodiment of this invention by a pedal-operable device forming an extension of the brake pedal. The pedal-operable device comprises an actuating rod with supporting and (hydraulic) lock which in the event of a failure of the auxiliary power permits a direct mechanical actuation of the master cylinder units without the occurrence of any loss of travel and permitting an abrupt change in the transmission ratio. The mechanical actuation requires no compensation because it becomes active only in the event of a brake valve failure. In the static circuits there always remains an enclosed hydraulic fluid safeguarding reserve. The apparatus employs a single-circuit auxiliary power supply requiring, in contrast to the state of the art, little auxiliary power and accordingly, resulting in an efficient apparatus with low power dissipation. In particular under normal braking conditions, the master cylinder pistons are hydraulically actuated, and a control at the secondary end is possible in contrast to the prior art embodiment initially referred to, i.e., the state of the art provides for build-up of a back pressure on the booster piston in the control case, which back pressure shifts the booster piston associated with the wheel brake cylinder to be controlled back against the pressure in the booster chamber, whereas in the present invention the pressure is simply let out at the secondary end of the master cylinder piston. In the arrangement of this invention, the need to provide costly booster components as in the known embodiment of German published and examined patent application DE-AS No. 2,366,108, such as booster piston with connecting and bleeder lines as well as seals, is avoided. Accordingly, there results a simplified construction. The simulator to be used may be comparatively small, and there results a low response force and hysteresis as well as lower simulator forces, because the servo travel simulator precedes the brake valve arranged parallel to the two master cylinder units. It is a particular advantage that the parallel arrangement enables the simulator to be dimensioned independently of the pedal force. The cross-sectional area of the actuating rod of the simulator being small, the reaction force thereby ensuing is correspondingly low. So long as auxiliary power is available, a brake operation will cause the actuating piston, i.e., the first piston of the master cylinder arrangement, to be acted upon by the controlled pressure so that an additional reaction force acting on the brake pedal will occur. In the event of a failure of the auxiliary power when all parts have to be moved by mechanical means, this affords the advantage of a relatively low back force on the brake pedal.

In an advantageous construction of this invention, an actuating rod including seating, lock, brake valve and simulator which in their entity provide likewise a compact structure, is arranged between two master cylinders. Since accumulator-pressure controlled hydraulic or mechanical locks are allocated to both the brake valve and the master cylinders, a power failure does not mean that loss of travel is inevitable in this embodiment. The mechanical actuation requires no compensation because it becomes effective only in the event of a booster failure. In total, there result few movable seals acted upon by the brake pressure and, accordingly, only low friction losses. The ratio of pedal force to brake pressure is substantially constant.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENTS

Figure 1:
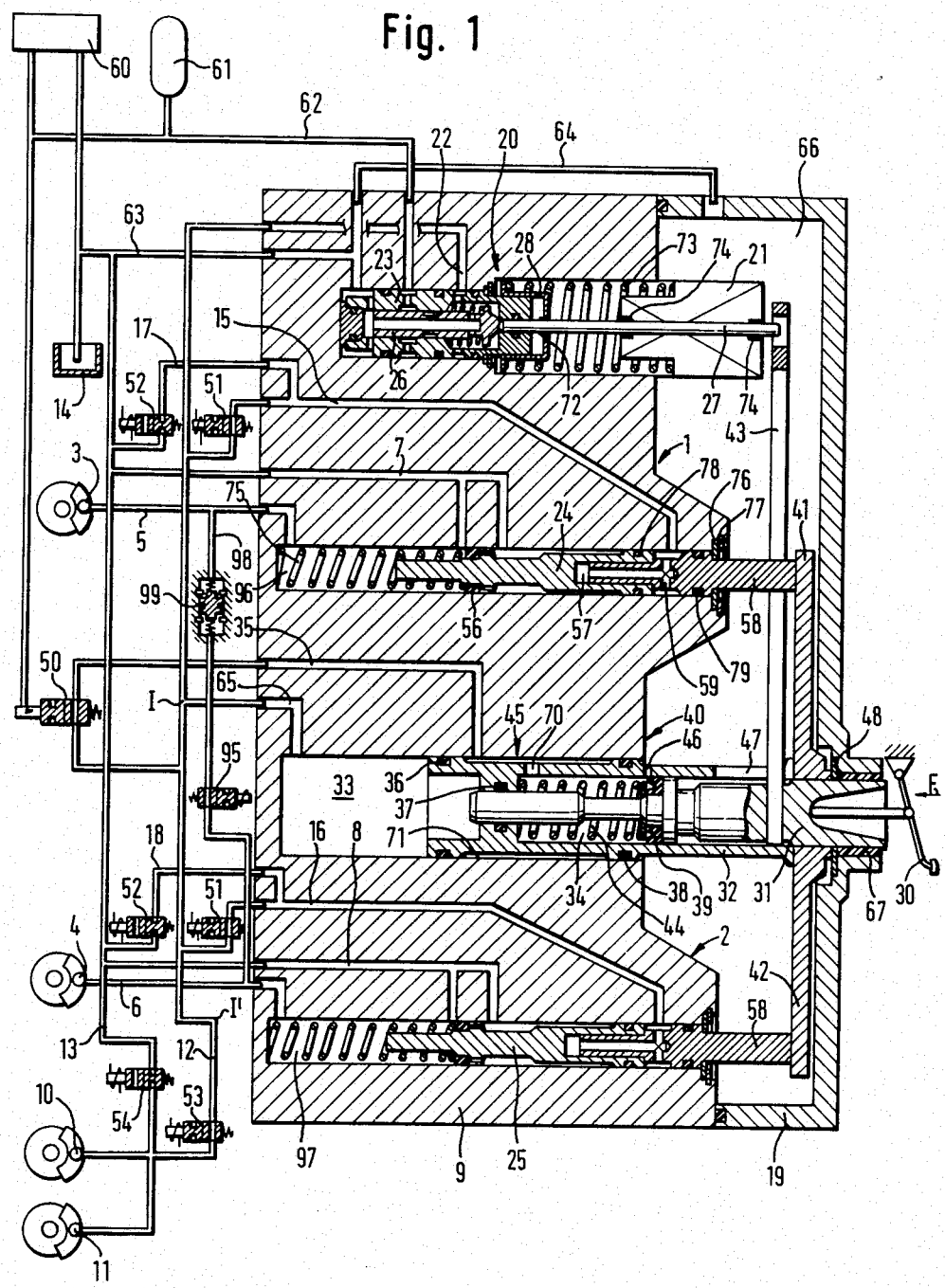
FIG. 1 is a partly diagrammatic, partly axial sectional view of a brake slip control apparatus of a three-circuit hydraulic brake system for vehicles constructed according to the present invention.

Referring now to the drawings in detail, and first to FIG. 1 thereof, it may be seen that a brake slip control apparatus in twin design includes two master cylinder units 1 and 2, a brake valve 20 preceded by a servo travel simulator and a pedal-operable device 40. This apparatus is designed for use in a three-circuit brake system. Two brake line circuits 5 and 6 are in communication with the master cylinder units 1 and 2 and permit a separate static activation of the two wheel brake cylinders 3, 4 of a vehicle front axle. Respective primary or working chambers 96, 97 of the master cylinder units 1, 2 are interconnected through a hydraulic line 98 accommodating a compensating valve 99 and a normally open electromagnetically actuatable two-way, two position directional control valve 95 which, in the brake slip control case of the front axle, shuts off the hydraulic line 98. The third brake line system 12, in addition to communicating with the pedal-operable device 40, communicates with the brake valve 20 and permits under normal braking conditions a dynamic activation of the wheel brake cylinders 10, 11 of the rear axle.

An auxiliary power source 60 with a pressure accumulator 61 communicates through a connecting line 62 with the inlet port of the brake valve 20, while the auxiliary power outlet port 22 of the brake valve is connected not only to the wheel brake cylinders 10, 11 of the rear axle but through connecting lines 15 and 16, respectively, also to the secondary ends of the master cylinder pistons 24 and 25, respectively, of the respective master cylinder units 1 and 2 which are of substantially identical design.

Inserted in the supply line leading to the wheel brake cylinders 10, 11 of the rear axle of the third brake line system 12 and in the connecting lines 15 and 16 of the master cylinder units 1 and 2 are normally open two-way, two-position directional control valves 53, 51 and 51, respectively, which are electromagnetically actuatable and shut off the passageway in the control case of the associated brake circuit.

Further, the secondary ends of the master cylinder pistons 24 and 25 of the master cylinder units 1 and 2 communicate with return lines 17 and 18, respectively, which lead to a hydraulic reservoir 14 and have inserted therein normally closed electromagnetically actuatable two-way, two-position directional control valves 52 which, in the control case of the associated brake circuit, open to release the return of fluid from the secondary ends of the master cylinder pistons 24, 25 to the hydraulic reservoir 14. In the control case, the associated directional control valve 51 of the supply line switches into the blocked position.

In a corresponding manner, the third brake line system 12 includes a normally closed electromagnetically actuatable two-way, two-position directional control valve 54 which is arranged in the return line 13 leading from the wheel brake cylinders 10, 11 of the rear axle to the unpressurized hydraulic reservoir 14 and opens in the control case, in which event the valve 53 will be closed.

Also the brake valve 20 is connected to the hydraulic reservoir 14 or the return system of the three brake circuits through a branch line 63 so that a hydraulic balance is created in the brake valve 20 following an actuation. Correspondingly, a compensating line 64 is provided leading from the unpressurized hydraulic reservoir 14 to the frontal inner area 66 of the integral arrangement comprising the master cylinder units 1 and 2, the brake valve 20 and the pedal-operable device 40 and positioned on the side close to the brake pedal 30 of a vehicle. The compensating line 64 with the frontal inner area 66 of the arrangement serves primarily to provide a hydraulic balance of the pedal-operable device 40 in operation which will be described in more detail hereinafter.

Compensating lines 7 and 8 known per se and leading to the hydraulic reservoir 14 are further provided for the master cylinder pistons 24 and 25.

The line system of the brake slip control apparatus further comprises an auxiliary power line 35 adapted to be shut off and leading from the auxiliary power outlet port 22 of the brake valve 20 through a normally open two-way, two-position directional control valve 50 to the pedal-operable device 40. The two-way, two-position directional control valve 50 will shut off the auxiliary power line 35 on a failure of the auxiliary power supply system.

A branch line 65 connects a receiving bore 33 of the housing base or an inner chamber with the branch point I of the third brake line system 12, so that, in operation, the receiving bore 33 is acted upon by auxiliary power through the auxiliary power outlet port 22 of the brake valve 20.

The brake valve 20 with the preceding servo travel simulator 21 is arranged in parallel with the two parallel master cylinder units 1 and 2 which have the pedal-operable device 40 interposed therebetween in an axially parallel relationship thereto. All above-named components are integrated into a single housing 9, 19, with the housing section 19 being designed as a sealed cap 19 of the arrangement and providing the frontal inner area 66 of the compensating system for the pedal-operable device 40.

The pedal-operable device 40 consists essentially of a first stepped piston 31 connected to the brake pedal 30 of a vehicle, with its end remote from the pedal being sealed to, and guided in, a second hollow piston 32 which in turn is sealed to, and guided in, the receiving bore 33 of the housing base. At its end close to the pedal, the first piston 31 has a rod-like cross link 43 rigidly secured to the piston 31, the front area thereof being movable into engagement with the servo travel simulator 21 of the brake valve 20.

In a similar manner, rod-like cross links 41 and 42 are rigidly connected to the end of the second piston 32 of the pedal-operable device 40 which is close to the pedal, with the front ends of the cross links 41, 42 being coterminous with the corresponding front ends of the master cylinder units 1 and 2 and bearing against them or being secured thereto. The cross links 41, 42 and 43 extend substantially perpendicular to the axially parallel individual devices or units of the whole arrangement consisting essentially of the brake valve 20, the pedal-operable device 40 and the two master cylinder units 1 and 2, with the cross link 43 which connects with the brake valve 20 extending through a longitudinal recess 47 in the second hollow piston 32.

At its end close to the pedal, the first piston 31 extends in a bore of the housing section 19 through a sealing bushing 67 in a sealed and axially slidably guided relationship. Inwardly relative to the housing, an abutment washer 48 serving as a stop for the second piston 32 or the associated cross links 41 and 42 is juxtaposed to the sealing bushing 67.

The first or inner stepped piston 31 is guided in the outer hollow section piston 32 in a manner providing an inner chamber 34. The inner chamber is sealed between the two pistons 31 and 32 by a ring seal 37 at the end remote from the pedal and by a cup seal 39 known per se at the end close to the pedal. The inner chamber 34 accommodates a compression spring 44 acting in the direction of the piston and urging the first and second piston 31, 32 apart.

A radial bore 70 and a circumferential recess 71 in the second piston 32 of the device 40 provide for sealed communication (through the ring seals 36 and 38 of the second piston 32) of the inner chamber 34 with the auxiliary power line 35 which is adapted to be shut off. In operation of the arrangement, a hydraulic lock 45 is thereby provided whose function will be further referred to below.

With the brake not actuated, the second piston 32 of the device 40 is in its right-hand initial position as shown in FIG. 1, in which the piston 32 is in abutment with the abutment washer 48. A radial outlet bore 46 of the piston establishes at the same time a connection between the inner chamber 34 and the compensating line 64.

In operation, the longitudinal recess 47 simultaneously serves as a compensating bore which cooperates with the cup seal 39 to enable hydraulic fluid to flow only from the compensating line 64 to the inner chamber 34 of the pedal-operable device 40 but not in the opposite direction.

The brake valve 20 with its preceding servo travel simulator 21 consists essentially of a valve member 23 known per se which is of a hollow piston design including an axial inner bore and radial bore connections for the auxiliary power inlet for the auxiliary power outlet port 22 as well as for the unpressurized return line. Guided in the hollow brake valve member 23 is an inner control piston 26 including an axial bore and, in its middle section, radial bores in order to ensure, in operation, communication between the auxiliary power inlet and outlet port 22 and to inhibit the return flow as is known per se. In operation, the inner control piston 26 is actuated by the axially slidable actuating rod 27 of the servo travel simulator 21.

The portion of the brake valve member 23 close to the pedal, through which the actuating rod 27 of the servo travel simulator 21 extends in a sealed and slidably guided manner, has its circumference enclosed by a stop bushing 28 which in its assembled state is axially located relative to the actuating rod 27 by a circlip 72 of the actuating rod 27. The stop bushing 28 serves to receive and support the one end of a compression spring 73 having its other end bearing against the servo travel simulator 21. The servo travel simulator 21 is secured to the actuating rod 27 by further circlips 74 in such a manner that the compression spring seated between the stop bushing 28 and the simulator produces a biasing force and that the cross link 43 enables the servo travel simulator to be urged in the brake actuating direction (to the left, as viewed in FIG. 1) against the force of the compression spring 73.

The master cylinder units 1, 2 further belonging to the compact aggregate arrangement are of substantially identical design so that the description of one master cylinder unit 1 will suffice. The master cylinder piston 24 known per se is axially slidably guided in a receiving bore of the housing 9, 19 and has at its end close to the pedal a blind-end bore into which the front end of the valve tappet 58 extends which is likewise axially slidably guided in the housing bore and may be secured to the rod-like cross link 41. With the arrangement out of operation, a spring 75 in the working chamber of the cylinder unit 1 urges the master cylinder piston 24 against a collar of the valve tappet 58 (to the right, as viewed in FIG. 1) which, in turn, bears in an axial direction against a lock washer 76 held by the circlip 77 at the housing and thus determines the initial position with the brake not actuated. The spring 75 may be so dimensioned that the entire mechanism may be returned to its inactive position if necessary. It will be understood that the valve tappets 58 of the master cylinder units may also bear against the cross links 41, 42 if the lock washer 76 and the circlip 77 are not available in an alternative design. The master cylinder piston 24 includes a cup seal 56 and compensating lines 7 known per se as well as another ring seal 78 in the area of the blind-end bore 57. Corresponding to the ring seal 78, another ring seal 79 is provided on the circumference of the valve tappet 58, so that the inner bore 59 of the valve tappet 58 is adapted for pressure-tight communication with the connecting line 15 for a hydraulic actuation of the master cylinder piston 24.

In operation of the above-described brake slip control apparatus in twin design including a servo travel simulator, the application of pedal force F to the brake pedal 30 or a similar brake operating member will cause movement of the first inner piston 31 of the device 40 to the left, as viewed in FIG. 1. The cross link 43 rigidly connected to the first piston 31 will move into engagement with the front end of the servo travel simulator 21 and urge the latter to the left as viewed in the drawing, in accordance with the spring characteristic. Thereby the spring 73 bearing against the stop bushing 28 will be further compressed, and the stop bushing 28 and the circlip 72 will cause movement of the actuating rod 27 to the left as viewed in the drawing, so that the inner control piston 26 of the brake valve 20 will be displaced to the left and isolate the branch line 63 (return) from the port 22 of the brake valve. Simultaneously, the branch line 62 upon which auxiliary power acts will be connected to the auxiliary power outlet port 22 of the brake valve so that the wheel brake cylinders 10, 11 of the rear axle of the third brake line system 12 will be dynamically activated with the two-way, two-position directional control valve 53 being open and the two-way, two-position directional control valve 54 being closed under non-controlled braking conditions. Because the auxiliary power outlet port 22 of the brake valve 20 will be further connected through the connecting line 15 to the secondary end of the master cylinder piston 24 of the master cylinder unit 1 when the two-way, two-position directional control valve 51 is open, the secondary end of the master cylinder piston 24 will be hydraulically activated at the same time. With the pressure in the sealed inner bore 59 of the valve tappet 58 increasing and with the valve tappet 58 axially located, the master cylinder piston 24 will move to the left, as viewed in the drawing, move across the port of the compensating line 7 and cause a pressure build-up in the working chamber 96 of the master cylinder unit 1, whereby the wheel brake cylinder 3 of a front-axle vehicle wheel in the first brake line system 5 will be statically activated.

In the same manner, the other wheel brake cylinder 4 of the front axle in the second brake line system 6 of the master cylinder unit 2 will be statically activated by the master cylinder piston 25 with the two-way, two-position directional control valve open. Because the working chambers 96 and 97 of the master cylinder units 1 and 2, respectively, are connected through the hydraulic line 98 in which the compensating cylinder 99 is arranged, the normally open two-way, two-position directional control valve 95 will provide for volume compensation between the first brake line circuit 5 and the second brake line circuit 6.

A release of the brake pedal 30 will cause a displacement of the inner control piston 26 of the brake valve 20 to the right, thereby releasing the unpressurized branch line 63 together with the outlet port 22 of the brake valve 20, while at the same time the pressure in the connecting lines 15 and 16 of the master cylinder units 1 and 2 will be decreased, so that both the pressure of the wheel brake cylinders 10, 11 of the rear axle and the pressure of the wheel brake cylinders 3 and 4 will be decreased through the third brake line circuit 12 and, respectively, the first and second brake line circuit 5 and 6 on displacement of the master cylinder pistons 24 and 25 to the right.

In normal actuation of a brake which corresponds to a non-controlled condition, the second piston 32 of the device 40 will remain in its (right-hand) initial position because, in the event of a braking action, the receiving bore 33 is acted upon by auxiliary power through branch line 65. Accordingly, the cross links 41 and 42 and thus the valve tappets 58 of the master cylinder units 1 and 2 will also remain in their (right-hand) initial positions. In this operating condition, the free end of the first piston 31 of the device 40, which end extends into the receiving bore 33, will be acted upon by auxiliary power and a reaction force will be built up in opposition to the actuating force F, enabling the servo travel simulator 21 with its compression spring 73 to be designed with small dimensions.

Further, in normal braking conditions, the two-way, two-position directional control valve 50 in the auxiliary power line, which line is adapted to be shut off, is open so that the inner chamber 34 of the device 40 will be pressurized by auxiliary power, the cup seal 39 of the first piston 31 will move beyond the compensating bore 46 of the second piston 32, while at the same time the compression spring 44 in the interior of the inner chamber 34 will be spring-biased, which spring likewise contributes to a small design of the servo travel simulator.

In the case of a control action taking place with the wheel brake cylinder 3 tending to lock, the normally open two-way two-position directional control valve 51, will be closed while at the same time the two-way, two-position directional control valve 52 in the return line 17 of the first master cylinder unit will be opened, whereby the pressure in the first brake line circuit 5 will be decreased. In a control of the wheel brake cylinder 3, the electromagnetically actuatable two-way, two-position directional control valve 95 will switch to its closed position, thereby blocking the hydraulic line 98 and keeping the compensating cylinder 99 inoperative.

In a similar manner, a pressure decrease will occur in the wheel brake cylinder 4 of the second brake line circuit 6.

The jointly controllable wheel brake actuating cylinders 10, 11 of the rear axle will experience a pressure decrease by the two-way, two-position directional control valve 53 of the third brake line system 12 being closed and the two-way, two-position directional control valve 54 in the return line 13 being opened.

In the event of a failure of the auxiliary power, the receiving bore 33 of the device 40 will be unpressurized and the two-way, two-position directional control valve 50 of the auxiliary power line 35 will be blocked, thereby maintaining a pressure cushion in the line 35 and in the inner chamber 34 of the device 40 which acts as a hydraulic lock 45. This results in a "fluid coupling"

between the first and second piston 31 and 32 of the pedal-operable device 40, and a simultaneous actuation of the cross links 41, 42 with the cross link 43 is ensured. Since in the event of an auxiliary power failure, the two-way, two-position directional control valves 51, 52 of the master cylinder units 1 and 2 will return to their position of rest, "hydraulic locks" will also be created in the connecting lines 15, 16, 17, 18 up to the blind-end bores 57 of the two master cylinder units 1 and 2. Accordingly, on a failure of the auxiliary power, the wheel brake cylinders 3, 4 of the first and second brake line circuits 5 and 6 are further statically actuatable which is accomplished by mechanical actuation of the cross links 41 and 42 and the associated valve tappets 58 through the hydraulic lock 45.

Figure 2:
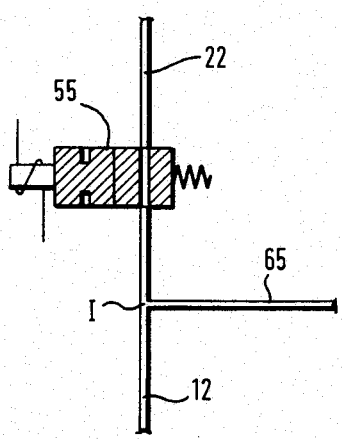
FIG. 2 is a diagrammatic view of a modified detail taken at the area of branch point I or I' of FIG. 1.

FIG. 2 shows a two-way, two-position directional control valve 55 interposed in the third brake line system 12 of the jointly controllable rear axle between the outlet port 22 of the brake valve 20 and the branch point I or I' of FIG. 1 where the line 65 branching to the receiving bore 33 of the pedal-operable device 40 terminates. The two-way, two-position directional control valve 55 is electromagnetically actuatable and normally open. On failure of the auxiliary power, the valve will close, this construction permitting under emergency conditions a static activation not only of the two brake line systems 5 and 6 of the front axle but also of the third brake line system 12 of the rear axle, which is accomplished by leftward movement of the second piston 32 of the device 40 of FIG. 1, in which case the hydraulic lock 45 comes into effect. The two cross-sectional areas of the working chambers of the master cylinder units 1 and 2 and the cross-sectional area of the receiving bore 33 are suitably adapted to the slave units. The valve 55 will be of particular advantage if the auxiliary power fails due to a leak in branch line 62.

Figure 4:
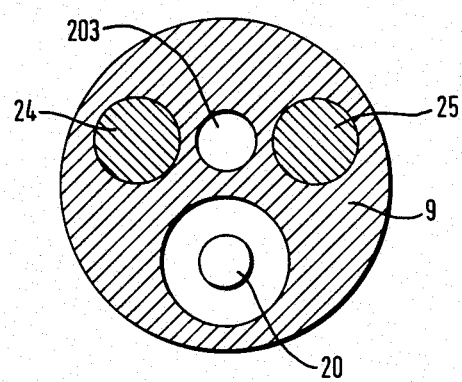
FIG. 4 is a diagrammatic cross-sectional view of the arrangement of FIG. 3.
Figure 3:
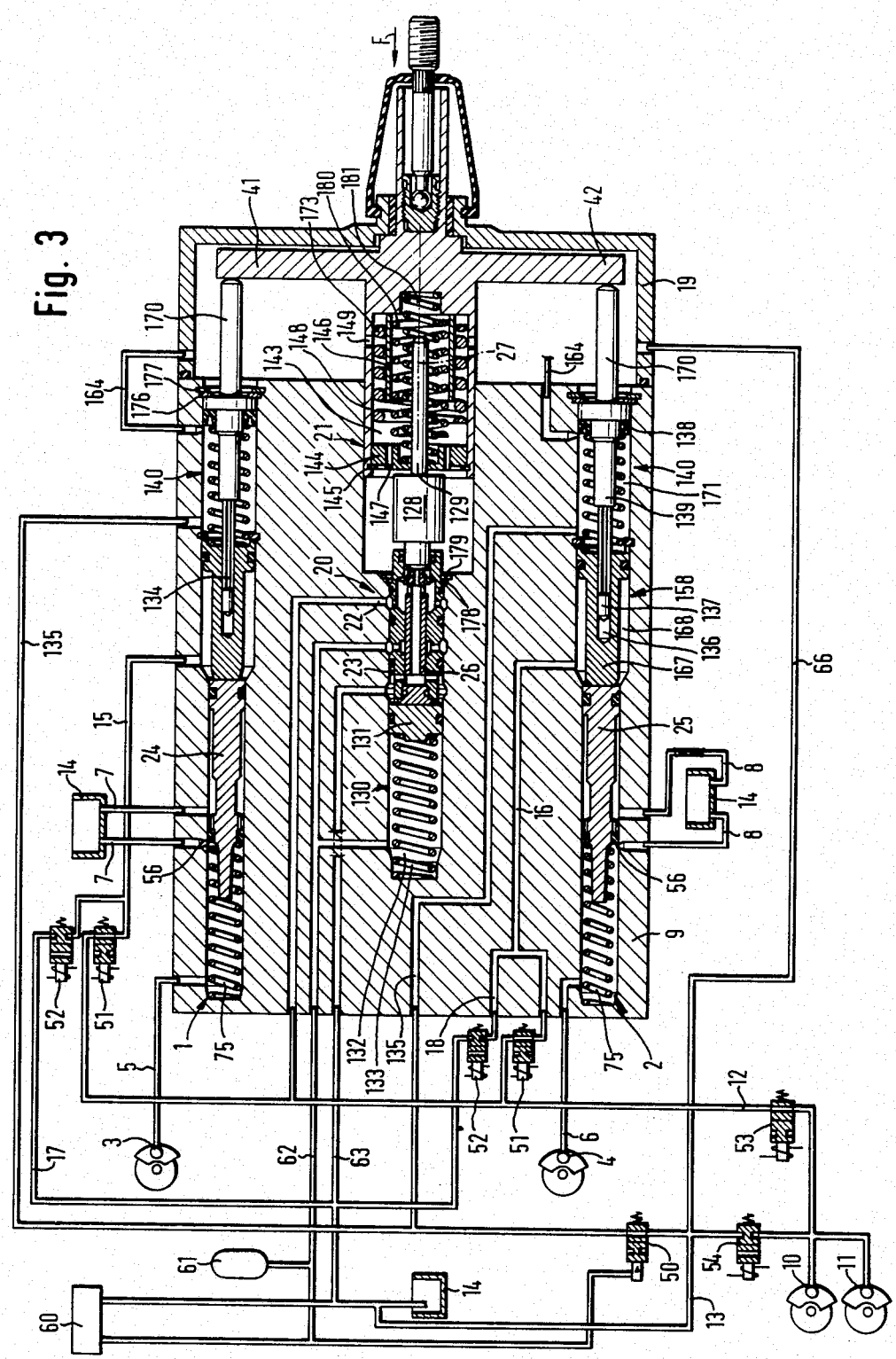
FIG. 3 is a view similar to that of FIG. 1 but illustrating a modified brake slip control apparatus in twin design, including two master cylinder units each having allocated to it a hydraulic lock.

The twin-design brake slip control apparatus shown in FIG. 3 comprises two master cylinder units 1 and 2 each preceded by a second hydraulic lock 140. A third hydraulic lock 130 is arranged subsequent to the brake valve 20 which is preceded by the servo travel simulator 21. The cross-sectional arrangement of the master cylinder units 1 and 2 including the master cylinder pistons 24 and 25 as well as of the brake valve 20 in the housing 9 will become apparent from FIG. 4. In particular, the axial bores for the master cylinder pistons 24 and 25 and the brake valve 20 are equidistantly spaced over the periphery. Arranged between the master cylinder pistons 24 and 25 is an axially parallel central guide bore 203 into which a guide rod engages in an axial extension of the brake actuating force F applied or the brake pedal, with the guide rod being adapted to be formed integrally with the cross links 41 and 42. Guide rod and guide bore serve to better take up the moments during a braking action.

The basic structure of the arrangement corresponds to that of FIG. 1. Like parts have been assigned like reference numerals.

Compensating lines 7, 8 and 164, respectively, are provided for both the master cylinder pistons 24, 25 and the hydraulic locks 140 of the master cylinder units 1, 2.

The conduit system of the brake slip control apparatus further includes a hydraulic line 135 adapted to be shut off and extending from each hydraulic lock 140 of an associated master cylinder unit 1 and 2 to the unpresurized fluid reservoir 14, there being inserted in that line a normally open two-way, two-position directional control valve 50 controlled by the available auxiliary power and adapted to close in the event of a pressure drop or failure of the auxiliary power.

Further included in the line system of the brake slip control apparatus is a hydraulic port of the (third) hydraulic lock 130 of the brake valve 20 to the branch line 62, so that the hydraulic lock 130 is normally acted upon by auxiliary power and thereby locked.

The two master cylinder units 1, 2 including the associated preceding hydraulic locks 140 and the interposed arrangement comprised of the third hydraulic lock 130, brake valve 20 and servo travel simulator 21, are received in three axially parallel stepped blind-end bores of a single housing 9 with an associated cap 19 close to the pedal through which the section of the servo travel simulator adjacent to the pedal extends, the simulator being actuatable by a brake pedal (not shown) in the actuating direction F.

The third hydraulic lock 130 comprises a piston 131 sealed on the periphery and bearing with its end remote from the pedal against the one end of a compression spring 133 in the blind-end bore 132 of the housing 9, the other end of the compression spring 133 abutting on the bottom of the blind-end bore 132 whereby a biasing force is exerted on the piston 131 to the right as viewed in the drawing, in a direction opposite the brake actuating force F.

The brake valve 20 inserted ahead of the third hydraulic lock 130 has a structure known per se, including a hollow piston 23 and a central control piston 26. The hollow piston 23 and its associated built-in parts are received in the blind-end bore 132 in an axially slidable relationship thereto, the piston being axially located at the end of the brake valve 20 close to the pedal by a lock washer 178 engaging into the housing and including a circlip 179 in a direction opposite to the brake actuating force F, with the spring-biased piston 31 of the third hydraulic lock 130 during the bult-in parts of the brake valve 20 to the right, as viewed in the drawing.

The servo travel simulator 21 preceding the brake valve 20 comprises an actuating rod 27 having an enlarged-diameter middle section 128 and a reduced-diameter end, remote from the pedal, which is axially slidably received in the brake valve 20 and abuts the control piston 26. A section 129 of the actuating rod 27 which is close to the pedal extends into the interior of a travel-limiting spring chamber 143 of the servo travel simulator whose housing 148 is axially slidably received in an enlarged section, close to the pedal, of the blind-end bore 132. The cup-type housing 148 has at its end close to the pedal integral cross links 41, 42 provided for actuation of the master cylinder units 1, 2 on a failure of the auxiliary power and is displaceable (to the left, as viewed in the drawing) through mechanical links at the end close to the pedal when a brake force is applied. In the interior of the travel-limiting spring chamber 143 are concentrically nested compression springs 173, 180, 181, with the innermost compression spring 181 being biased against a spring ring 144, remote from the pedal, of the travel-limiting spring chamber 143. The spring ring 144 is slidably received in the end of the cup-type simulator housing 148 remote from the pedal and is axially located at its end remote from the pedal by a circlip 145 of the housing 148. The two outer compression springs 173 and 180 embracing the compression spring 181 are not biased in the inactive position of the simulator (shown) and are held centered by an inner bushing 146 concentrically arranged in the travel-limiting spring chamber 143. Adjacent to the centric bore of the spring ring 144 for axially slidably supporting the section 129 of the actuating rod 27 close to the pedal, the spring ring 144 further includes an eccentric passage bore 147 which, together with a radial bore 149 of the travel-limiting spring chamber housing, enables unpressurized hydraulic fluid to reach all cavities of the servo travel simulator 21 in operation.

The master cylinder units 1,2 accommodated in the housing 9, 19 are of substantially identical design so that it will be sufficient to describe one single master cylinder unit 1 or 2.

The master cylinder piston 24, 25 known per se has a cup seal 56 and compensating lines 7, 8 and in the absence of brake application, the piston 24, 25 is urged into its initial position (to the right, as shown) by a compression spring 75 whereby the piston end close to the pedal abuts on the reduced-diameter end 167, remote from the pedal, of a piston tappet 158 arranged in an axial extension of the master cylinder piston 24, 25 in an enlarged section of the receiving bore and axially located at the end close to the pedal by a circlip on the housing in a direction opposite the brake actuating force F. The reduced-diameter end 167 of the piston tappet 158 causes a circumferential chamber 168 to be defined in the receiving bore which chamber communicates with the connecting line 16.

The master cylinder units 1 and 2 described in the foregoing and substantially consisting of master cylinder piston 24, 25 and piston tappet 158 are preceded by a (second) hydraulic lock 140 likewise accommodated in the respective receiving bore in the housing 9, 19. The second hydraulic lock 140 consists essentially of a piston tappet member 139 with a cup seal 138 and a compensating line 164. The piston tappet member 139 possesses an end 137, remote from the pedal, which slidably engages into a blind-end bore 136 of the piston tappet 158, with an inner longitudinal passageway 134 or a longitudinal groove being provided at the piston tappet member 139 to provide a hydraulic fluid connection to the bottom of the blind-end bore 136. In operation, the foremost section of the end 137 may (on a failure of the auxiliary power) abut against the bottom of the blind-endbore 136.

The end 137 of the piston tappet member 139 remote from the pedal has a reduced diameter so that an internal circumferential chamber 171 connected to the hydraulic line 135 is formed in the receiving bore. The interior of the circumferential chamber 171 accommodates a compression spring seated between the piston tappet member 139 and the piston tappet 158 and urging the piston tappet member 139 against an axial stop formed by a lock washer 176 and a circlip 177 in the non-applied condition of the brake. At its end close to the pedal, the piston tappet member 139 has a reduced-diameter rod-like end 170 engaging the respective rod-like cross link 41 or 42.

The mode of operation of the above-described twin-design brake slip control apparatus with servo travel simulator and second and third hydraulic locks will be described in the following.

In a normal braking case, auxiliary power will be available, acting upon the piston 131 of the third hydraulic lock 130 through line 62. The third lock 130 holds the preceding brake valve 20 together with the servo travel simulator 21 in an operational position.

On actuation of the brake pedal in the direction F, the basic part of the servo travel simulator 21 consisting of housing 148 and the two cross links 41, 42 will be displaced to the left, as viewed in the drawing; the spring ring 144 will abut against the axial collar of the enlarged-diameter middle section 128 of the actuating rod 27 and, with the spring 181 continuing to be compressed and the outer compression springs 180 and 173 possibly being also compressed in the travel-limiting spring chamber 143, the spring ring 149 will shift the actuating rod 27 to the left to control the inner control piston 26 of the brake valve 20. At this time, the third hydraulic lock 130 causes the brake valve hollow piston 23 to remain axially located. With the brake valve 20 suitably activated, the branch line 63 (return) will be isolated from the port 22 of the brake valve 20. At the same time, the branch line 62 acted upon by auxiliary power will be connected to the auxiliary power outlet port 22 of the brake valve so that the wheel brake cylinders 10, 11 of the rear axle of the third brake line system 12 are dynamically activated, with the two-way, two-position directional control valve 53 being open and the two-way, two-position directional control valve 54 being closed under non-controlled braking conditions. Because the auxiliary power outlet port 22 of the brake valve 20 is further connected through the connecting line 15 to the secondary end of the master cylinder piston 24 of the master cylinder unit 1 in the open state of the two-way, two-position directional control valve 51, the secondary end of the master cylinder piston 24 will be hydraulically activated at the same time. With the pressure in the circumferential chamber 168 increasing and the piston tappet 158 being axially located, the master cylinder piston 24 will move to the left as viewed in the drawing, travel beyond the port of the compensating line 7 and effect a pressure buildup in the working or primary chamber of the master cylinder. This pressure buildup statically activates the wheel brake cylinder 3 of a vehicle wheel of the first front axle in the first brake line system 5.

Similarly, the other wheel brake cylinder 4 of the front axle in the second brake line circuit 6 of the master cylinder unit 2 will be statically activated through the master cylinder piston 25 with the two-way, two-position directional control valve 51 open and the two-way, two-position directional control valve 52 of the return line closed.

A release of the brake pedal results in a rightward displacement of the inner control piston 26 of the brake valve 20, whereby the unpressurized branch line 63 will be connected with the outlet port 22 of the brake valve 20, while at the same time the pressure in the connecting lines 15 and 16 of the master cylinder units 1 and 2 will be decreased, so that there will occur a decrease in both the pressure of the wheel brake cylinders 10, 11 of the rear axle through the third brake line circuit 12 and the pressure of the wheel brake cylinders 3 and 4 of the first and second brake line circuits 5 and 6 on displacement of the master cylinder pistons 24 and 25 to the right.

In normal operation of a brake, the piston tappet 158 will remain in its axially located position (as shown) because the second hydraulic lock 140 is released. With the pressure from the auxiliary power source available, the two-way, two-position directional control valve 50 which is controllable by the accumulator pressure will be switched to an open position (also electromagnetical actuation possible), so that the circumferential chamber 171 of the second lock 140 will be connected to unpressurized hydraulic fluid. In consequence of this, the piston tappet member 139 engaged with a cross link 41 or 42 is movable to the left, as viewed in the drawing, in opposition to the force of the compression spring arranged in the circumferential chamber 171. The two compression springs in the circumferential chambers 171 of the two hydraulic locks 140 exert an additional reaction force, permitting a suitably small dimension of the central servo travel simulator 21.

In the case of a control action taking place with the wheel brake cylinder 3 tending to lock, the normally open two-way, two-position directional control valve 51 will be closed while at the same time the two-way, two-position directional control valve 52 in the return line 17 of the first master cylinder unit 1 will be opened whereby a pressure decrease will be accomplished in the first brake line system 5 on return movement of the master cylinder piston 24.

In a similar manner, a pressure decrease will occur in the wheel brake cylinder 4 of the second brake line circuit 6.

The jointly controllable wheel brake cylinders 10, 11 of the rear axle will experience a pressure decrease due to the fact that the two-way, two-position directional control valve 53 of the third brake line circuit 12 is closed and the two-way, two-position directional control valve 54 in the return line 13 is opened.

On failure of the auxiliary power, the piston 131 of the third hydraulic lock 130 will cease to be acted upon by the auxiliary power so that it will be movable to the left, as viewed in the drawing, in conjunction with the parts of the brake valve 20 arranged in the housing 9 and the preceding servo travel simulator 21, in opposition to the force of the compression spring 133 in the blind-end bore 132. The servo travel simulator 21 is thereby inactivated. At the same time, the two-way, two-position directional control valve 50 will switch to its blocking condition so that the second hydraulic lock 140 will be activated and the piston tappet member 139 will form a "fluid coupling" with the piston tappet 158. In the same manner, the piston tappet 158 will form a fluid coupling with the associated master cylinder piston 24, 25 with the control valves 51, 52 closed. This ensures a static activation of the front axle in the event of a failure of the auxiliary power, without loss of travel and the need to overcome the reaction force of the servo travel simulator. The arrangement is so designed that the master cylinder pistons 24, 25 are also directly mechanically actuatable when the parts 139, 158 and 24 or 25 abut against each other.

While we have described above the principles of our invention in connection with specific apparatus, it is to be clearly understood that this description is made only by way of example and not as a limitation to the scope of our invention as set forth in the objects thereof and in the accompanying claims.

We claim:

1. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising at least one master cylinder unit, including means for bounding a master cylinder bore, and a master piston received in said master cylinder bore for axial movement therein and subdividing said bore into a primary compartment communicating in use with the braking circuit, and a secondary compartment;

a brake control valve unit interposed in use between the auxiliary source and said secondary compartment and operative for controlling the pressure in the latter;

means for operating said brake control valve unit in dependence on the position of the brake operating member in use, including a travel simulator preceding said brake control valve unit as considered in the direction of force transmission from the brake operating member to said brake control valve unit;

means for directly coupling said master piston with said operating means for joint movement therewith at least in said direction and at least upon failure of the auxiliary source;

wherein said coupling means includes a cylinder-and-piston unit operatively connected to the brake operating member and acted upon during normal operation with the auxiliary source operational in direction toward the brake operating member by a pressure derived from the auxiliary source, and a first mechanical link extending from said cylinder-and-piston unit to said master piston; wherein said operating means further includes a second mechanical link extending from said cylinder-and-piston unit to said travel simulator; and further comprising means for interlocking said mechanical links upon failure of the auxiliary source; and wherein said interlocking means is a hydraulic interlocking means.

2. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising at least one master cylinder unit, including means for bounding a master cylinder bore, and a master piston received in said master cylinder bore for axial movement therein and subdividing said bore into a primary compartment communicating in use with the braking circuit, and a secondary compartment;

a brake control valve unit interposed in use between the auxiliary source and said secondary compartment and operative for controlling the pressure in the latter;

means for operating said brake control valve unit in dependence on the position of the brake operating member in use, including a travel simulator preceding said brake control valve unit as considered in the direction of force transmission from the brake operating member to said brake control valve unit;

means for directly coupling said master piston with said operating means for joint movement therewith at least in said direction and at least upon failure of the auxiliary source;

wherein said coupling means includes a cylinder-and-piston unit operatively connected to the brake operating member and acted upon during normal operation with the auxiliary source operational in direction toward the brake operating member by a pressure derived from the auxiliary source, and a first mechanical link extending from said cylinder-and-piston unit to said master piston; wherein said operating means further includes a second mechanical link extending from said cylinder-and-piston unit to said travel simulator; and further comprising means for interlocking said mechanical links upon failure of the auxiliary source; and further comprising a common housing accommodating said units and said operating and coupling means and a reservoir for the hydraulic fluid formed integrally in said housing; and wherein said first and second mechanical links are situated in said reservoir.

3. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising at least one master cylinder unit, including means for bounding a master cylinder bore, and a master piston received in said master cylinder bore for axial movement therein and subdividing said bore into a primary compartment communicating in use with the braking circuit, and a secondary compartment;

a brake control valve unit interposed in use between the auxiliary source and said secondary compartment and operative for controlling the pressure in the latter;

means for operating said brake control valve unit in dependence on the position of the brake operating member in use, including a travel simulator preceding said brake control valve unit as considered in the direction of force transmission from the brake operating member to said brake control valve unit;

means for directly coupling said master piston with said operating means for joint movement therewith at least in said direction and at least upon failure of the auxiliary source;

wherein said coupling means includes a cylinder-and-piston unit operatively connected to the brake operating member and acted upon during normal operation with the auxiliary source operational in direction toward the brake operating member by a pressure derived from the auxiliary source, and a first mechanical link extending from said cylinder-and-piston unit to said master piston; wherein said operating means further includes a second mechanical link extending from said cylinder-and-piston unit to said travel simulator; and further comprising means for interlocking said mechanical links upon failure of the auxiliary source; and wherein said cylinder-and-piston unit includes means for defining a receiving bore, a hollow outer piston guided in said receiving bore, and an inner piston guided within said outer piston and coupled with the brake operating member, said inner and outer pistons together bounding an inner chamber; and wherein said interlocking means includes an auxiliary power conduit communicating with said inner chamber, and means for interrupting communication through said auxiliary conduit to form a hydraulic lock in said inner chamber; and wherein said first mechanical link is connected to said outer piston at the end of the latter which is closer to the brake operating member, and said second mechanical link is connected to said inner piston at the end of the latter which is closer to the brake operating member.

4. The master cylinder arrangement as defined in claim 3, wherein said outer piston and said first mechanical link are integral with one another.

5. The master cylinder arrangement as defined in claim 4, further comprising a common housing accommodating said units and said operating and coupling means and a reservoir for the hydraulic fluid formed integrally in said housing; wherein said first and second links are situated in said reservoir; wherein said outer piston has at least one axially compensating passage communicating said reservoir with the interior of said outer piston; and wherein said second mechanical link extends with clearance through said compensating passage.

6. The master cylinder arrangement as defined in claim 5, wherein said housing has an abutment; and wherein said outer piston is movable into engagement with said abutment.

7. The master cylinder arrangement as defined in claim 3, wherein said cylinder-and-piston unit further includes a compression spring accommodated in said inner chamber and acting on said inner and outer pistons in the axial direction.

8. The master cylinder arrangement as defined in claim 3, wherein said cylinder-and-piston unit further includes a deflectable lip seal between said inner and outer pistons at the end close to the brake operating member, and annular seals between said inner and outer pistons at the end remote from the brake operating member and between the outer piston and said means for defining said receiving bore.

9. The master cylinder arrangement as defined in claim 3, and further comprising a relief conduit connected to said auxiliary power conduit, a normally open two-way two-position directional control valve connected to said auxiliary power conduit, and means for closing said directional control valve upon the occurrence of auxiliary source failure.

10. The master cylinder arrangement as defined in claim 3 for use in a braking system including a dynamically actuated braking circuit, wherein said outer piston delimits a chamber in said receiving bore remote from the brake operating member; and further comprising means for connecting said chamber with the dynamically actuated braking circuit.

11. The master cylinder arrangement as defined in claim 10, wherein said brake control valve unit includes an auxiliary pressure port communicating with the dynamically actuated braking circuit; and further comprising a normally open two-way two-position directional control valve situated in said dynamically actuated braking circuit upstream of said connecting means, and means for closing said directional control valve upon the occurrence of auxiliary source failure.

12. The master cylinder arrangement as defined in claim 3, wherein said brake control valve unit includes an inner control piston, wherein said travel simulator includes an actuating rod acting on said inner control piston; and further comprising a stop bushing and a spring supported in said stop bushing and acting on said travel simulator oppositely to the direction of force transmission from the brake operating member to the brake control valve unit.

13. The master cylinder arrangement as defined in claim 3, wherein said master cylinder unit further includes a spring acting on said master piston in opposition to the direction of force transmission from the brake operating member to the master piston, a deflectable lip seal on said master piston, and means bounding a blind bore receiving an end portion of said master piston, at its end closer to the brake operating member; and further comprising a value tappet received in said blind bore and connected to said first mechanical link, said valve tappet having an inner bore.

14. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising at least one master cylinder unit, including means for bounding a master cylinder bore, and a master piston received in said master cylinder bore for axis movement therein and subdividing said bore into a primary compartment communicating in use with the braking circuit, and a secondary compartment;

a brake control valve unit interposed in use between the auxiliary source and said secondary compartment and operative for controlling the pressure in the latter;

means for operating said brake control valve unit in dependence on the position of the brake operating member in use, including a travel simulator preceding said brake control valve unit as considered in the direction of force transmission from the brake operating member to said brake control valve unit;

means for directly coupling said master piston with said operating means for joint movement therewith at least in said direction and at least upon failure of the auxiliary source;

wherein said coupling means includes a mechanical link, and locking means preceding said master piston as considered in the direction of force transmission from the brake operating member to said piston and ineffective for force transmission during normal operating conditions with the auxiliary source operational, and becoming effective for coupling said master piston to said mechanical link for joint movement therewith at least in said direction upon failure of the auxiliary source; and wherein said locking means is a hydraulic means.

15. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising at least one master cylinder unit, including means for bounding a master cylinder bore, and a master piston received in said master cylinder bore for axial movement therein and subdividing said bore into a primary compartment communicating in use with the braking circuit, and a secondary compartment;

a brake control unit interposed in use between the auxiliary source and said secondary compartment and operative for controlling the pressure in the latter;

means for operating said brake control valve unit in dependence on the position of the brake operating member in use, including a travel simulator preceding said brake control valve unit as considered in the direction of force transmission from the brake operating member to said brake control valve unit;

means for directly coupling said master piston with said operating means for joint movement therewith at least in said direction and at least upon failure of the auxiliary source;

wherein said coupling means includes a mechanical link, and locking means preceding said master piston as considered in the direction of force transmission from the brake operating member to said master piston and ineffective for force transmission during normal operating conditions with the auxiliary source operational, and becoming effective for coupling said master piston to said mechanical link for joint movement therewith at least in said direction upon failure of the auxiliary source; and wherein said master cylinder unit further includes a deflectable lip seal surrounding said master piston, means for biasing said master piston opposite to said direction, a piston tappet axially slidably received in said master cylinder bore, and means for limiting the extent of movement of said piston tappet opposite to said direction, said piston tappet having a larger-diameter position axially delimiting said secondary chamber, and a smaller-diameter portion extending from said larger-diameter portion toward said master piston and having a cross-sectional area smaller than the latter to delimit a clearance in said secondary chamber.

16. The master cylinder arrangement as defined in claim 15, wherein said piston tappet has a blind bore opening axially away from said master piston and wherein said locking means includes a piston tappet member received in said master cylinder bore ahead of said piston tappet as considered in said direction and having a larger-diameter central portion sealingly slidable in said master cylinder bore, a smaller-diameter first end portion extending from said central portion into said blind bore of said piston tappet to be snugly and slidably received therein, and a second end portion extending from said central portion toward engagement with said mechanical link, said larger-diameter portions of said piston tappet member and said piston tappet and said first end portions together bounding an annular locking chamber in said master cylinder bore, and said locking means further including at least one spring coaxially received in said locking chamber and urging said piston tappet and said piston tappet member axially apart, a relief conduit communicating with said locking chamber, and a two-way two-position directional control valve interposed in said relief conduit and closed when the auxiliary source is operational and open upon failure of the auxiliary source.

17. The master cylinder arrangement as defined in claim 16, and further comprising means for limiting the extent of movement of said central portion of said piston tappet member opposite to said direction.

18. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising
- at least one master cylinder unit, including means for bounding a master cylinder bore, and a master piston received in said master cylinder bore for axial movement therein and subdividing said bore into a primary compartment communicating in use with the braking circuit, and a secondary compartment;
- a brake control valve unit interposed in use between the auxilary source and said secondary compartment and operative for controlling the pressure in the latter;
- means for operating said brake control valve unit in dependence on the position of the brake operating member in use, including
- a travel simulator preceding said brake control valve unit as considered in the direction of force transmission from the brake operating member to said brake control valve unit;
- means for directly coupling said master piston with said operating means for joint movement therewith at least in said direction and at least upon failure of the auxiliary source;
- wherein said coupling means includes a mechanical link, and locking means preceding said master piston as considered in the direction of force transmission from the brake operating member to said master piston and ineffective for force transmission during normal operating conditions with the auxiliary source operational, and becoming effective for coupling said master piston to said mechanical link for joint movement therewith at least in said direction upon failure of the auxiliary source; and
- and further comprising additional locking means succeeding said brake control valve unit as considered in the direction of force transmission from the brake operating member to said brake control valve unit and operative for opposing the movement of said brake control valve unit and of said travel simulator in the latter direction during normal braking operation with the auxiliary source operational and for releasing said brake control valve unit and said travel simulator for such movement upon failure of the auxiliary source.

19. The master cylinder arrangement as defined in claim 18, wherein said additional locking means is a hydraulic locking means.

20. The master cylinder arrangement as defined in claim 18, wherein said additional locking means includes mechanical locking means, and means for controlling the operation of said mechanical locking means in dependence on the pressure derived from the auxiliary source.

21. The master cylinder arrangement as defined in claim 18, wherein said travel simulator is coaxial with and connected to the brake operating member; wherein said master cylinder unit is transversely offset from said brake control valve unit; wherein said coupling means includes a mechanical link between said travel simulator and said master piston; and wherein said additional locking means includes means defining a blind bore, a locking piston received in said blind bore and delimiting a compartment therein, an internal compression spring received in said compartment and urging said locking piston toward said brake control valve unit; and means for connecting said compartment with the auxiliary source.

22. The master cylinder arrangement as defined in claim 21, wherein said brake control valve unit includes a valve body resting against said locking piston.

23. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising
- at least one master cylinder unit, including means for bounding a master cylinder bore, and a master piston received in said master cylinder bore for axial movement therein and subdividing said bore into a primary compartment communicating in use with the braking circuit, and a secondary compartment;
- a brake control valve unit interposed in use between the auxiliary source and said secondary compartment and operative for controlling the pressure in the latter;
- means for operating said brake control valve unit in dependence on the position of the brake operating member in use, including
- a travel simulator precdeding said brake control valve unit as considered in the direction of force transmission from the brake operating member to said brake control valve unit;
- means for directly coupling said master piston with said operating means for joint movement therewith at least in said direction and at least upon failure of the auxiliary source;
- further comprising solenoid-operated valves interposed in the braking system and operative for controlling the anti-skid operation of the latter;
- including at least two additional braking circuits each incorporating at least one additional brake actuating cylinder; further comprising an additional master cylinder unit similar to said master cylinder unit and arranged in parallel thereto; wherein said primary compartment of said additional master cylinder unit communicates with a first of the additional braking circuits so that said master cylinder units respectively statically actuated the brake actuating cylinders incorporated in the one and the first additional braking circuits; wherein said brake control valve unit is arranged in parallel to said master cylinder units and includes means for defining a bore, and a valve body slidably received in said bore and delimiting a control compartment therein which communicates with the second of the additional braking circuits for dynamically actuating the brake actuating cylinders incorporatd therein; and further comprising means for communicating said control compartment of said brake control valve unit with said secondary compartments of said master cylinder units; and
- wherein said communicating means includes separate auxiliary pressure conduits each communicating with one of said secondary compartments; and further comprising means for selectively disconnecting said auxiliary pressure conduits from said control compartments, and means for relieving the pressure in said auxiliary pressure conduits.

24. The master cylinder arrangement as defined in claim 23, for use on a vehicle having two front and two rear wheel brakes, wherein the brake actuating cylinders incorporated in the one and the first additional braking circuits are respectively associated with the front wheel brakes while the brake actuating cylinders incorporated in the second of the additional braking circuit are respectively associated with the rear wheel brakes.

25. The master cylinder arrangement as defined in claim 23, wherein said travel simulator is coaxial with and connected to the brake operating member; wherein said master cylinder unit is transversely offset from said brake control valve unit; and wherein said coupling means includes a mechanical link between said travel simulator and said master piston.

26. The master cylinder arrangement as defined in claim 25, wherein said brake control valve unit includes an inner piston; and wherein said travel simulator includes an actuating rod acting on said inner piston, means defining a travel-limiting chamber, an axially slidable spring-supporting ring in said chamber; a stop delimiting the extent of sliding of said ring at the end of said chamber remote from the brake operating member, and at least one spring in said chamber and bearing against said ring.

27. The master cylinder arrangement as defined in claim 26, wherein said travel simulator further includes at least one additional spring of a spring characteristic different from that of said spring, said springs being movable during normal operation into contact with said ring.

28. The master cylinder arrangement as defined in claim 27, wherein said springs are coaxially nested compression springs.

29. The master cylinder arrangement as defined in claim 28, wherein said travel simulator further includes at least one bushing portion separating said springs from one another.

30. The master cylinder arrangement as defined in claim 26, wherein said ring has a central opening and wherein said actuating rod has an enlarged middle section adapted to bear against said ring, and a reduced section extending through and slidably guided in said central opening of said ring and extending into said chamber.

31. The master cylinder arrangement as defined in claim 26, further comprising a reservoir for the hydraulic fluid; and means for connecting said chamber of said travel simulator with said reservoir.

32. The master cylinder arrangement as defined in claim 31, wherein said ring has a passageway for the passage of unpressurized hydraulic fluid therethrough.

33. The master cylinder arrangement as defined in claim 26, wherein said means for defining said travel-limiting chamber and said mechanical link are integral with one another.

34. A master cylinder arrangement for use in conjunction with an auxiliary source of pressurized fluid in a braking system, especially of a vehicle, for controlling the effective pressure of a hydraulic braking fluid in at least one braking circuit incorporating at least one brake actuating cylinder, in dependence on the position of a brake operating member, especially a brake pedal, comprising at least one master cylinder unit, including means for bounding a master cylinder bore, and a master piston received in said master cylinder bore for axial movement therein and subdividing said bore into a primary compartment communicating in use with the braking circuit, and a secondary compartment;

a brake control valve unit interposed in use between the auxiliary source and said secondary compartment and operative for controlling the pressure in the latter;

means for operating said brake control valve unit in dependence on the position of the brake operating member in use, including a travel simulator preceding said brake control valve unit as considered in the direction of force transmission from the brake operating member to said brake control valve unit;

means for directly coupling said master piston with said operating means for joint movement therewith at least in said direction and at least upon failure of the auxiliary source;

further comprising solenoid-operated valves interposed in the braking system and operative for controlling the anti-skid operation of the latter;

including at least two additional braking circuits each incorporating at least one additional brake actuating cylinder; further comprising an additional master cylinder unit similar to said master cylinder unit and arranged in parallel thereto; wherein said primary compartment of said additonal master cylinder unit communicates with a first of the additional braking circuits so that said master cylinder units respectively statically actuated the brake actuating cylinders incorporated in the one and the first additional braking circuits; wherein said brake control valve unit is arranged in parallel to said master cylinder units and includes means for defining a bore, and a valve body slidably received in said bore and delimiting a control compartment therein which communicates with the second of the additional braking circuits for dynamically actuating the brake actuating cylinders incorporated therein; and further comprising means for communicating said control compartment of said brake control valve unit with said secondary compartments of said master cylinder units; and further comprising a compensating conduit interconnecting said master cylinder units, a compensating cylinder unit interposed in said compensating conduit, and a normally open two-way, two-position directional control valve interposed in said compensating conduit and closing the same upon occurrence of brake slip control condition relating to the brake actuating cylinders incorporated in the one and the first additional braking circuit.

* * * * *